United States Patent
Yiu et al.

(10) Patent No.: US 6,928,291 B2
(45) Date of Patent: Aug. 9, 2005

(54) METHOD AND APPARATUS FOR DYNAMICALLY CONTROLLING RELEASE OF PRIVATE INFORMATION OVER A NETWORK FROM A WIRELESS DEVICE

(75) Inventors: Jennifer O. Yiu, Fremont, CA (US); Ramkumar Venketaramani, Foster City, CA (US); Suresh B. Bashyam, Sunnyvale, CA (US); Seetharaman Ramasubramani, San Jose, CA (US)

(73) Assignee: Openwave Systems Inc., Redwood City, CA (US)

( * ) Notice: Subject to any disclaimer, the term of this patent is extended or adjusted under 35 U.S.C. 154(b) by 689 days.

(21) Appl. No.: 09/895,521

(22) Filed: Jun. 29, 2001

(65) Prior Publication Data

US 2003/0181205 A1 Sep. 25, 2003

Related U.S. Application Data

(60) Provisional application No. 60/264,210, filed on Jan. 25, 2001.

(51) Int. Cl.[7] ................................................ H04Q 7/20
(52) U.S. Cl. .............................. 455/456.1; 455/426.1; 455/404.2
(58) Field of Search ..................... 455/426.1, 456.1, 455/456.3, 432.1, 414.3, 404.2, 440, 457, 414.2

(56) References Cited

U.S. PATENT DOCUMENTS

| | | | | |
|---|---|---|---|---|
| 5,740,539 A | * | 4/1998 | Ishii | 455/456.1 |
| 5,907,804 A | * | 5/1999 | Schroderus et al. | 455/411 |
| 6,311,069 B1 | * | 10/2001 | Havinis et al. | 455/456.4 |
| 6,571,212 B1 | * | 5/2003 | Dent | 704/270.1 |
| 6,687,504 B1 | * | 2/2004 | Raith | 455/456.1 |
| 6,687,505 B1 | * | 2/2004 | Hagebarth | 455/456.2 |
| 6,716,101 B1 | * | 4/2004 | Meadows et al. | 340/989 |

* cited by examiner

Primary Examiner—Marsha D. Banks-Harold
Assistant Examiner—Nghi H. Ly
(74) Attorney, Agent, or Firm—Blakely, Sokoloff, Taylor & Zafman LLP

(57) ABSTRACT

A proxy gateway is coupled to one or more wireless hand-held devices over a wireless network and to one or more origin servers over a wired network. The proxy gateway proxies requests and responses between the wireless devices and the origin servers. The proxy gateway determines when private information associated with a wireless device is needed or requested by another network entity, such as an origin server. In response to such determination, the proxy gateway communicates with the wireless device to enable the wireless device to present a user interface which allows a user of the wireless device to dynamically control release of the private information.

24 Claims, 8 Drawing Sheets

METHOD AND APPARATUS FOR DYNAMICALLY CONTROLLING RELEASE OF PRIVATE INFORMATION OVER A NETWORK FROM A WIRELESS DEVICE

This application claims the benefit of Provisional U.S. patent application No. 60/264,210, filed on Jan. 25, 2001, entitled, "Privacy Negotiation Model", which is incorporated herein by reference.

FIELD OF THE INVENTION

The present invention pertains to techniques for controlling the release of private information over a network. More particularly, the present invention relates to controlling the release of private information over a network from a wireless, hand-held device.

BACKGROUND OF THE INVENTION

Present technology allows users of hand-held, wireless devices to access to applications on the Internet. Some of those applications need to access information about wireless devices which may be considered private. Two types of information which may be considered private are information on whether a wireless device is currently turned on ("presence" information) and information about the geographic location of a wireless device ("location" information). For example, a network application might need to know the location of a wireless device in order to provide the device with real-time traffic or weather updates relevant to the user's location. Other examples of private information are serial numbers and telephone numbers of wireless devices.

Wireless devices commonly access the Internet through a gateway which links the wireless network to the Internet. The gateway or a separate server system may act as a proxy server, which proxies requests from the wireless devices to applications on the Internet. In some cases, when private information is needed by a network application in order to process a request from a wireless device, the proxy server adds the private information to the request before sending the request to the network application.

The proxy server is typically operated by the wireless carrier. However, the wireless carrier generally cannot release private information to network applications without prior authorization from the subscriber. Today, the subscriber's authorization to release private information is normally acquired in a paper agreement or click-through agreement. These types of privacy agreement can be cumbersome to manage and normally must be in place before a subscriber attempts to access applications which require private data. Further, there is no way for the subscriber to give permission to release private data on a per request basis. In addition, the carrier generally must inform the subscriber about every modification to the agreement manually, and the user must agree to this before the modifications can take effect.

SUMMARY OF THE INVENTION

The present invention includes a method and apparatus for dynamically controlling the release of information on a network. The method includes determining that protected information associated with a hand-held wireless communication device is needed or requested by a remote network entity, and in response, enabling a user of the hand-held wireless communication device to dynamically control release of the protected information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
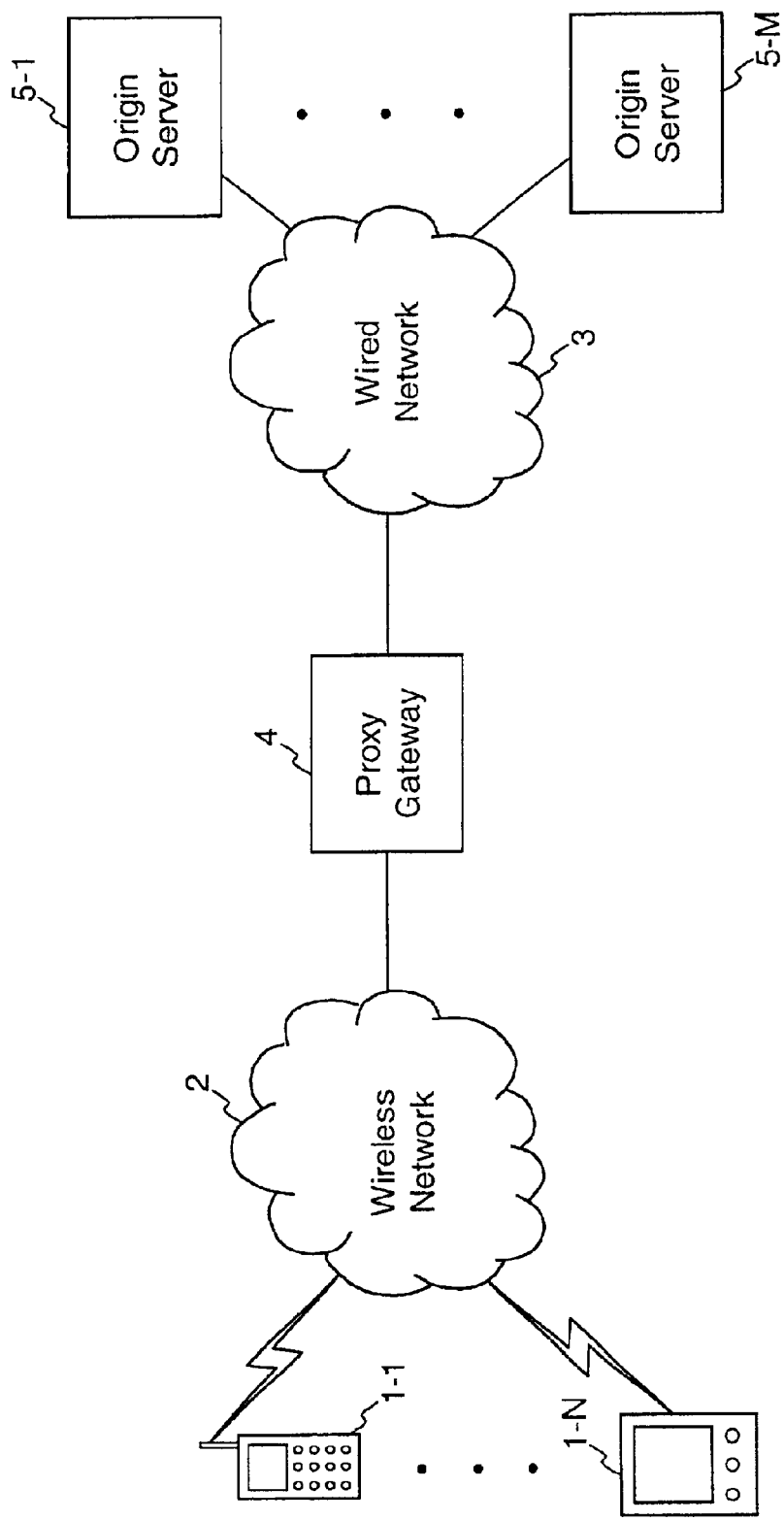
FIG. 1 illustrates a network environment in which mobile devices can communicate with origin servers and service initiators.

A method and apparatus for controlling the release of private information over a network from a wireless, hand-held device are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The techniques described herein relate to controlling the release of information often considered by users to be "private", such as location or presence information, subscriber numbers, etc. Note, however, that the described techniques can be applied to controlling the release of essentially any type of information. That is, the described technique can be used to dynamically negotiate essentially any parameter with a user. Hence, information which is controlled using the techniques described herein is referred to generally in this specification as "protected" information, which may be (but does not have to be) private information.

The present invention allows a user's authorization to release private information to be obtained dynamically, e.g., in response to a request. This allows authorization to be given (or denied) on a per request basis and reduces the need for cumbersome paper or click through privacy agreements. In addition, the technique can be implemented over a standard network communication protocol, such as hypertext transfer protocol (HTTP).

As described in greater detail below, in one embodiment a processing system is coupled to one or more wireless hand-held communication devices (hereinafter "wireless devices") over a wireless network and to one or more origin servers over a wired network. The processing system may be a proxy gateway, which proxies requests and responses between the wireless devices and the origin servers. The processing system determines when protected (e.g., private) information associated with a wireless device, such as location or presence information, is needed or requested by another network entity, such as an origin server. Upon making such a determination, the proxy gateway initiates an exchange of information with the wireless device to dynamically determine whether release of the protected information is authorized by the user of the wireless device. In one embodiment, the wireless device presents a user interface which allows the user to dynamically authorize or prohibit release of the protected information. The user may grant or deny permission to release the information for only the current interaction or for all future interactions with the network entity. The protected information is then only released to the extent authorized by the user. In one embodiment, this dynamic determination of user permission to release protected information is accomplished over standard HTTP. In other embodiments, other standards may be used.

In this description, various acts are described as being performed by a proxy gateway in connection with establishing a privacy agreement with a user (in addition to standard proxy or gateway functions). Note, however, that a proxy gateway is only one example of a platform in which the described acts can be carried out. The acts related to establishing a privacy agreement do not have to be performed by a device that acts as a proxy or as a gateway. They may instead be performed in a processing system that is separate from any proxy or gateway, which may be a processing system dedicated to performing such acts, or a processing system which performs the described acts in addition to having other purposes. Nonetheless, typically, those acts will be performed by a processing system controlled by a wireless carrier (i.e., the operator of the wireless network 2), although that also is not necessarily so.

FIG. 1 illustrates an example of a network environment in which the present invention can be implemented. A number (N) of wireless devices 1—1 through 1-N operate on a wireless network 2. Each of the wireless devices 1 may be, for example, any of: a cellular telephone, a personal digital assistant (PDA), a notebook (laptop) computer, a two-way pager, or any other hand-held wireless device. The wireless network 2 is coupled to a conventional wired computer network 3 through a proxy gateway 4. The wired network 3 may be, for example, the Internet, a corporate intranet, a wide area network (WAN), a local area network (LAN), a public switched telephone network (PSTN), or a combination thereof. The proxy gateway 4 uses well-known techniques to enable communication between the wireless devices 1 and a number (M) of processing systems ("origin servers") 5-1 through 5-M operating on the wired network 3. The physical computing platforms which embody the proxy gateway 4 and processing systems 5 may include, for example, conventional personal computers (PCs) and/or server-class computer systems.

At least some of the origin servers 5 may be conventional web servers on the World Wide Web. Accordingly, origin servers 5 provide content to the wireless devices 1 in response to standard (e.g., WAP or HTTP) requests from the wireless devices 1. In some cases, origin servers 5 may (or alternatively) "push" content to the mobile devices 1, i.e., send content to the mobile devices 1 without the content having been requested by the mobile devices 1. Content provided to the wireless devices 1 by the origin servers 5 may include, for example, hypermedia documents, email, short messages, real-time updates of traffic, stock quotes or weather, and the like.

In one embodiment, the wireless devices 1 do not support the same protocols or languages used by the origin servers 5. For example, the wireless devices 1 might support only wireless markup language (WML) and wireless access protocol (WAP), while the origin servers 5 use only hypertext markup language (HTML) or extensible mark-up language (XML) and HTTP. In that case, the gateway feature of proxy gateway 4 converts/translates between the languages and protocols used by processing systems 5 and the languages and protocols used by the mobile devices 1 to allow these entities to communicate with each other. In other embodiments, some or all of the wireless devices 1 might directly support the protocol (or language) used by the origin servers 5, such as HTTP. In such embodiments, at least some of the translation/conversion operations would not be needed for those devices.

To facilitate explanation, it is henceforth assumed in this description that the wireless devices 1 and the origin servers 5 all support HTTP. It will be recognized, however, that the techniques described herein can be easily adapted to network environments in which that is not the case.

Proxy gateway 4 also operates as a proxy for transmitting various requests and responses on behalf of the mobile devices 1 and the processing devices 5, as described further below. Note that while proxy gateway 4 is shown as a single network entity, the proxy and gateway functions can be distributed between two or more physical platforms. Furthermore, both functions do not necessarily have to be used in a given network environment, as noted above.

Origin servers 5 may require private information relating the wireless devices 1, such as information of the types mentioned above. The information may be needed by the origin servers 5 in order to process requests from the wireless devices 1 or in order to push information to the wireless devices 1. Accordingly, another responsibility of the proxy gateway 4 is to determine when private information associated with one of the wireless devices 1 is needed or requested by another network entity, such as an origin server 5. In response to making such a determination, the proxy gateway 4 transmits information to the subject wireless device 1, to cause a browser in the wireless device 1 (sometimes called a "minibrowser" or "microbrowser") to generate a predetermined graphical user interface (GUI) mode. The predetermined GUI mode allows the user to dynamically provide or deny permission to release the private information. By "dynamically", what is meant is that the user is prompted to provide or deny permission in response to a contemporaneous determination (by proxy gateway 4, for example) that private information associated with the user is needed or requested.

The predetermined GUI mode is henceforth referred to as the "privacy negotiation GUI" to facilitate description. Note, however, that the process is not necessarily a "negotiation" in a strict sense. The information transmitted by the proxy server 4 to the wireless device 1 may be, for example, mark-up language code (e.g., a WML deck) for use by the wireless device to generate the privacy negotiation GUI. Alternatively, the mark-up language code for generating the privacy negotiation GUI may be stored permanently or semi-permanently in the wireless device, in which case the information transmitted by the proxy server 4 may be a simple signal to cause the wireless device to generate the privacy negotiation GUI.

Private information relating to a wireless device 1 may be normally stored within the wireless device 1. In that case, when authorized by the user, the wireless device 1 releases the private information to the proxy gateway 4, to allow the proxy gateway 4 to release the information to other network entities, as authorized. Alternatively, the private information may already be stored within the proxy gateway 4 when a need or request for such information is detected. In that case, the proxy gateway 4 merely needs to release the information when it receives authorization to do so.

Figure 2:
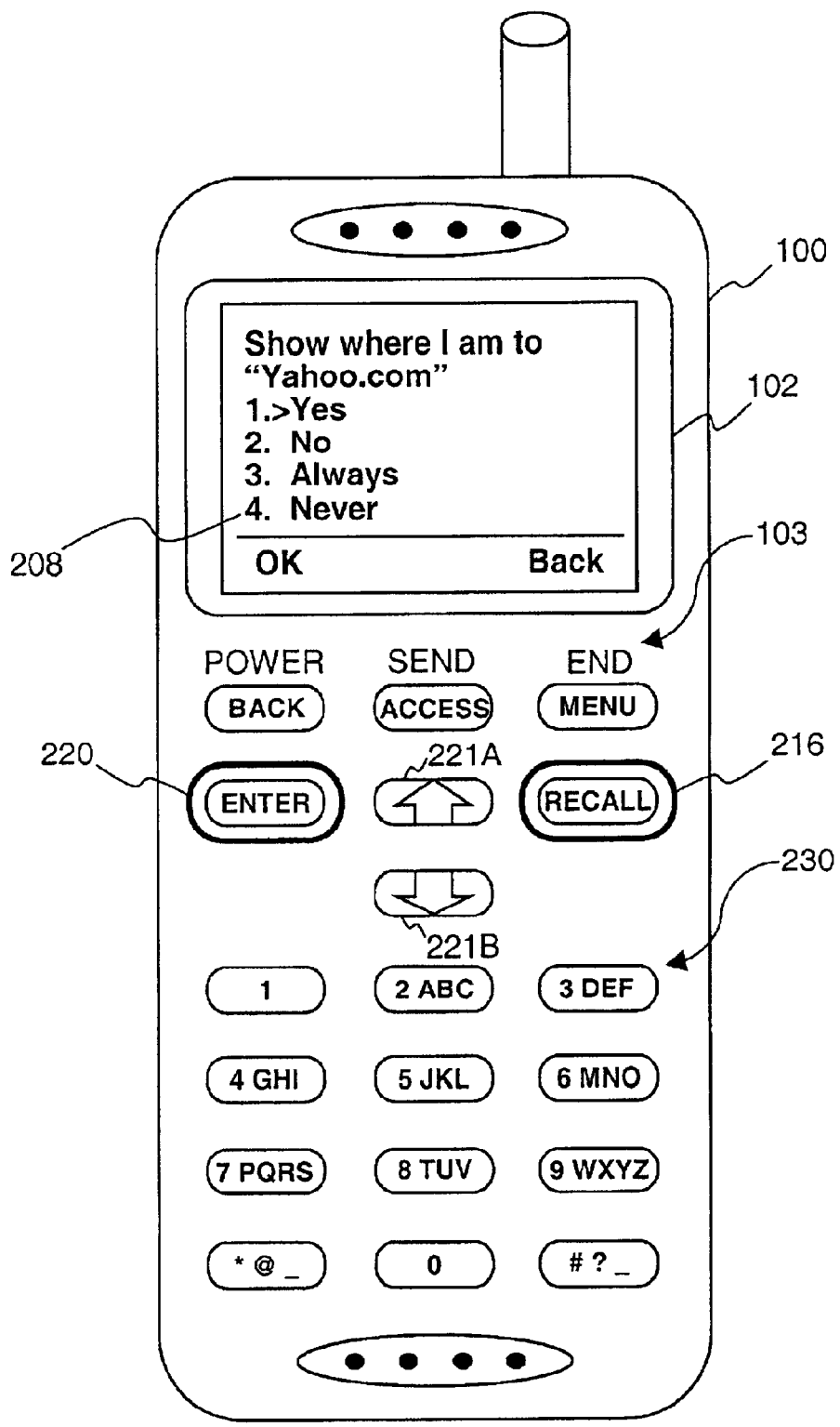
FIG. 2 shows a cellular telephone.

FIG. 2 shows an example of one of the wireless devices 1, in particular a cellular telephone 100, in which the privacy negotiation GUI may be implemented. As shown, the telephone 100 includes a display 102 and a keypad 103. Display 102 may display hypermedia information, such as information 208. Function keys 216 and 220 can be used to activate softkeys. Keypad 103 includes alphanumerical keys 230 (such as for dialing a telephone numbers and entering hyperlinks), function keys 216 and 220, directional arrow keys 221A and 221B. Arrow keys 221A and 221B are used to navigate through information displayed on display 102, such as to move a selection indicator (e.g., highlighting), cursor, pointer, or other indicator, or to scroll the display.

The hypermedia information 208 shown in FIG. 2 is one example of the privacy negotiation GUI, generated by a browser in the telephone 100. As shown, it includes a list of selectable items ("Yes", "No", "Always", "Never") from which the user of the device can select to dynamically specify privacy parameters permissions. The GUI may enable the user to provide or deny permission to release the private information for only the current request (by choosing "Yes" or "No") or for all requests associated with the target application (by choosing "Always" or "Never"). Each of the selectable items may represent a hyperlink which has a corresponding Uniform Resource Identifier (URI). These URI's may correspond to network addresses within the proxy gateway 4.

Hypermedia information 208 may be, for example, a WML file ("deck") including one or more WML cards. In certain modes of operation, activating function key 220 while a displayed item is selected (e.g., highlighted) causes the telephone 100 to retrieve and display a WML card associated with a URI of that item. In addition, by using the alphanumerical keys 230, the user may enter a URI manually to access hypermedia content.

Figure 3:
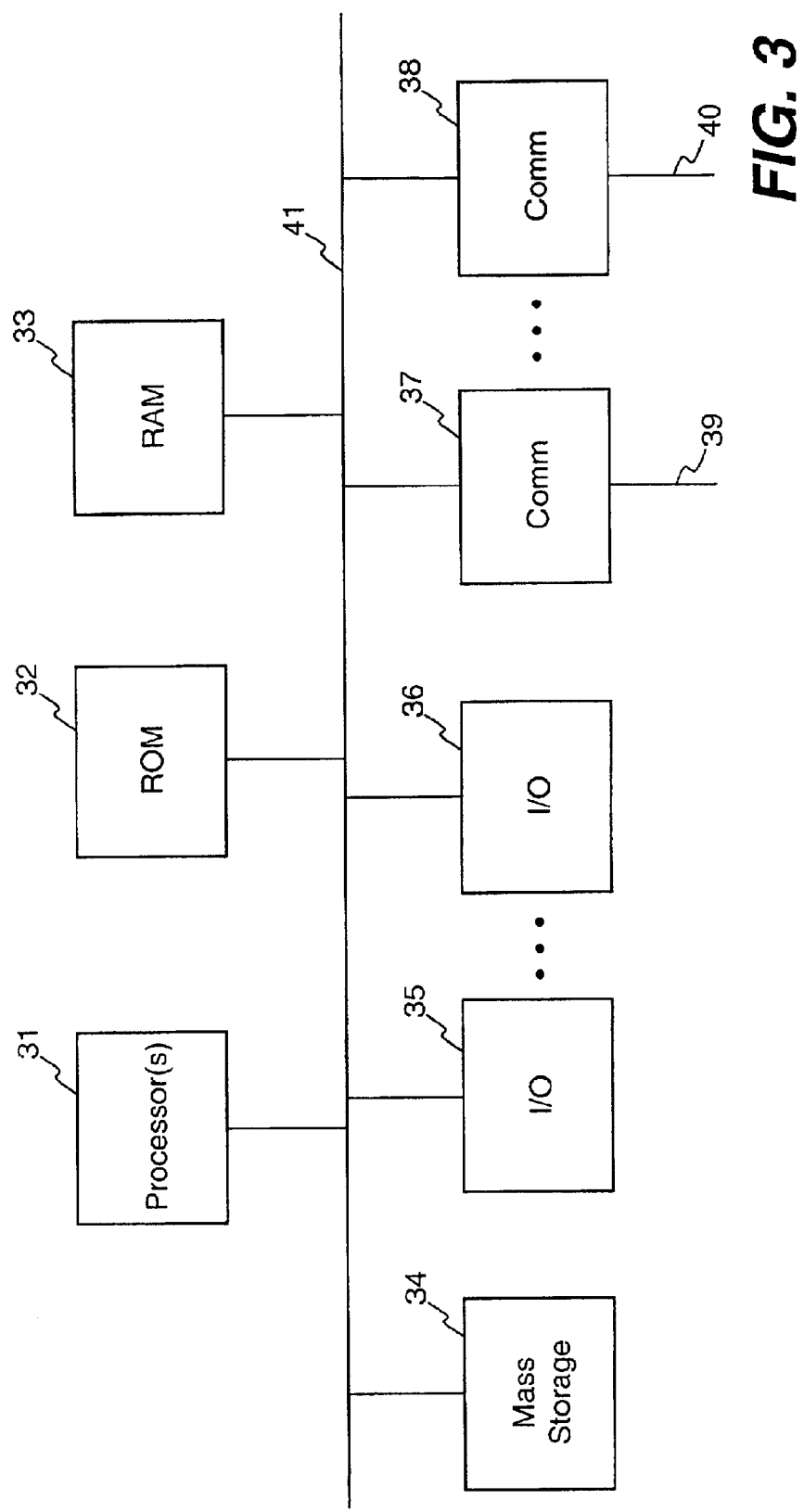
FIG. 3 illustrates a processing system representative of any or the devices shown in FIG. 1.

FIG. 3 illustrates the internal components of a processing system which may represent any of the devices shown in FIG. 1. Note that FIG. 3 is not intended to represent any one specific physical arrangement of components, as such details are not germane to the present invention and are well within the knowledge of those skilled in the art. Variations of the described structure may be appropriate according to the particular type of device being referred to, which variations will be readily apparent to those skilled in the art.

The illustrated processing system includes one or more processors 31, i.e. a central processing unit (CPU), read-only memory (ROM) 32, and random access memory (RAM) 33, each connected to a bus system 41. Also coupled to the bus system 41 are a mass storage device 34, one or more input/output (I/O) devices 35 through 36, and one or more data communication devices 37 through 38. Note that a server would not necessarily require any I/O devices in addition to a data communication device.

The processor(s) 31 may be, or may include, one or more programmable general-purpose or special-purpose microprocessors or digital signal processors (DSPs), application specific integrated circuits (ASICs), programmable logic devices (PLDs), or a combination of such devices. The bus system 41 includes one or more buses, which may be connected to each other through various bridges, controllers and/or adapters, such as are well-known in the art. For example, the bus system may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1392 bus (sometimes referred to as "Firewire").

Mass storage device 17 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices. The I/O devices 35 through 36 may include, for example, any one or more of: a keyboard or keypad, a pointing device (e.g., a mouse, trackball, or touchpad), a display device, and an audio speaker.

The data communication devices 37 and 38 may be any devices suitable for enabling the processing system to communicate data with a remote processing system over a data communication link, such as a wireless transceiver (e.g., if implemented in a wireless device), a conventional telephone modem, a wireless modem, an Integrated Services Digital Network (ISDN) adapter, a Digital Subscriber Line (DSL) modem, a cable modem, a satellite transceiver, an Ethernet adapter, or the like. At least one of communication links 39 and 40 may be a wireless link, such as to provide the connection between wireless devices 1 and wireless network 2 in FIG. 1.

Note that while FIG. 3 shows two communication devices 37 and 38, more than one data communication device would not necessarily be required. The proxy gateway 4 does require at least two communication interfaces (i.e., one to connect to the wireless network 2 and one to connect to the wired network 3), although these interfaces potentially can be implemented in a single physical device.

Figure 4:
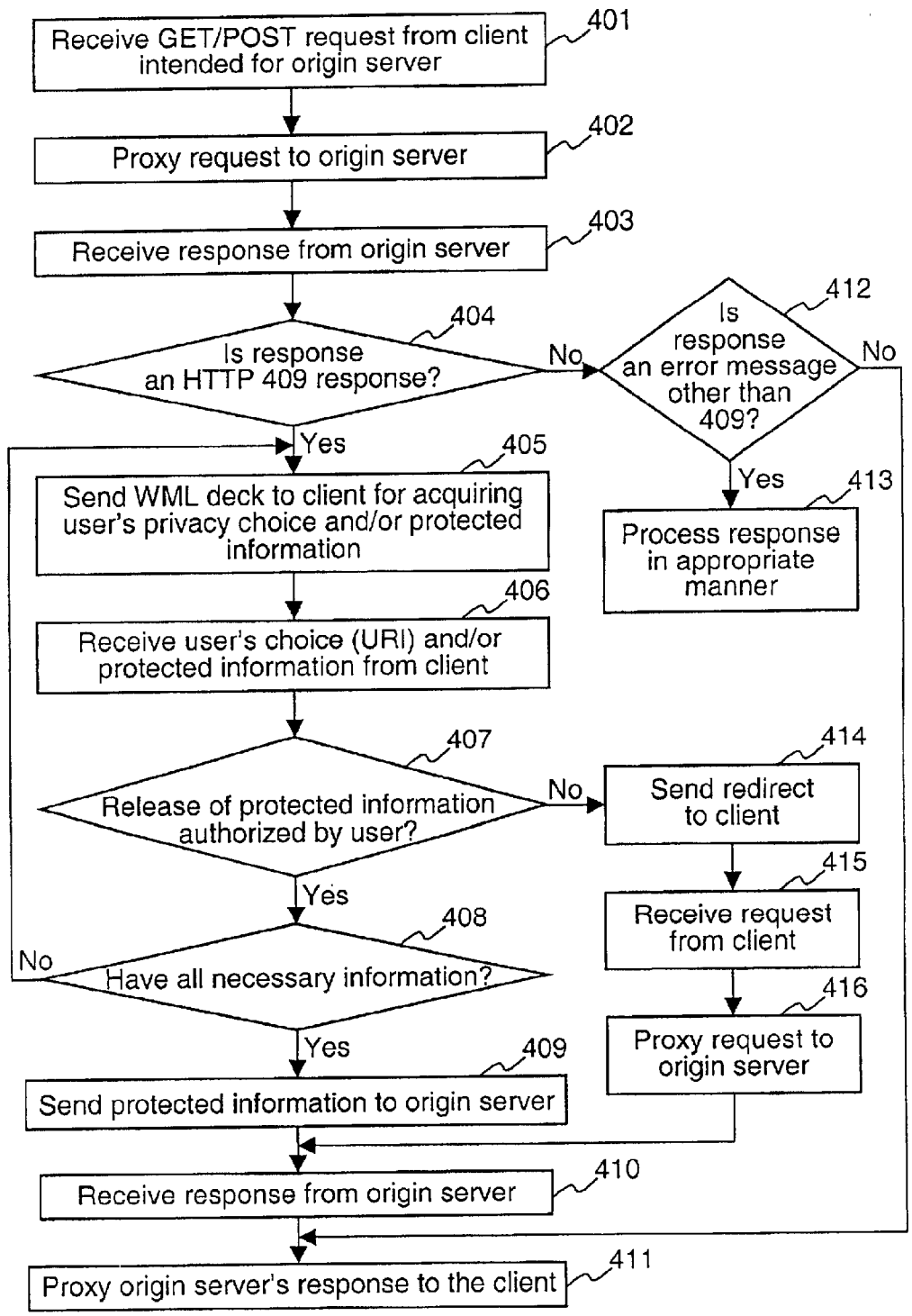
FIG. 4 is a flow diagram showing a process that may be implemented by the proxy gateway, according to a first embodiment, to obtain a user's permission to release private information.
Figure 5:
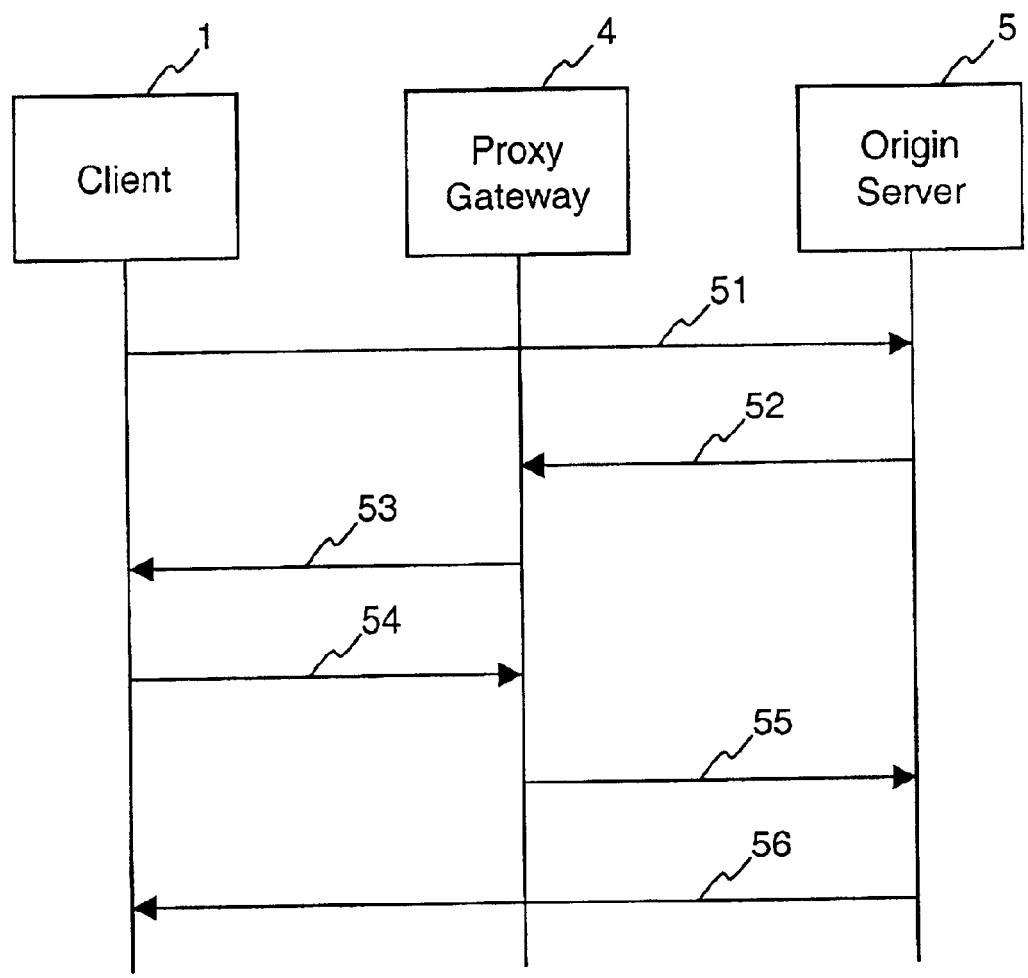
FIG. 5 illustrates the exchange of messages between network entities for the process of FIG. 4.

FIG. 4 illustrates a process that may be implemented by the proxy gateway 4, according to a first embodiment, to obtain a user's permission to release private information. FIG. 5 illustrates the exchange of messages between network entities for the process of FIG. 4. In FIGS. 4 and 5, the sequence progresses downward in the Figure as time advances.

In this first embodiment, the proxy gateway 4 lacks the "intelligence" to determine, solely from a client's request, that private information is needed to process the request. Initially, at process block 401, proxy gateway 4 receives a standard HTTP GET/Post request 51 from one of the wireless devices 1 (the "client"), and proxies the request to the targeted origin server 5 at block 402. At block 403 the proxy gateway 4 receives a response 52 at to the request from the origin server 5.

If the origin server 5 requires additional information to process the request, such as presence or location information from the client 1, the origin server 5 responds with a standard "409" error message as defined in HTTP version 1.1. Accordingly, if the proxy gateway 4 identifies the origin server's response 52 as an HTTP "409" error message at block 404, then at block 405 the proxy gateway 4 sends to the client 1 a WML deck 53 to cause the client 1 to generate the privacy negotiation GUI.

If the private information is already stored within the proxy gateway 4 or the user denies permission to release information, the proxy gateway 4 may receive only the user's choice at block 406. Conversely, if the private information is not currently available to the proxy gateway 4, then the private information may be provided to the proxy gateway 4 by the wireless device 1 at block 406, assuming the user gives permission to do so. The user's choice may be in the form of a URI, as noted above. The client 1 may provide the private information to the proxy gateway 4 in any suitable manner, such as in a markup language document or in an extended header of a markup language document.

If the response 52 from the origin server 5 was an error message other then a "409" error message (block 412), then the response 52 is processed in an appropriate manner at block 413, which is not germane to the present invention. If the response 52 is not an error message at block 412, then the proxy gateway 4 simply proxies the origin server's response 52 to the client 1 at block 411.

If the proxy gateway 4 determines at block 407 that the user authorized release of the private information, based on the client's response 54 to the WML deck, and if all of the required information is available at block 408, then the proxy gateway 4 sends the private information 55 to the origin server 5 at block 409. As an alternative, at block 409 the proxy gateway 4 may send the origin server 5 a new request, which includes the private information and all of the information in the original request 51 from the client 1. At block 410, the proxy gateway 4 receives a response from the origin server 5, and it proxies the response to the client 1 at block 411.

If the proxy gateway 4 determines at block 407 that permission to release of the private information was denied by the user, then the proxy gateway 4 sends a redirect to the client 1 at block 414, to reset the browser context and to cause the browser to retry its original request. The new request is received by the proxy gateway 4 at block 415 and proxied to the origin server at block 416. The origin server will presumably respond to this new request with another HTTP 409 response, which is received by the proxy gateway 4 at block 410 and proxied to the client 1 at block 411. If permission to release the information was given, but not all necessary information was received (block 408), the process loops back to block 405.

Of course, many variations upon this process are possible without departing from its basic principle. For example, certain operations might be added or deleted from the above-described process, or the sequence of operations altered, while still employing the same basic principle.

Figure 6A:
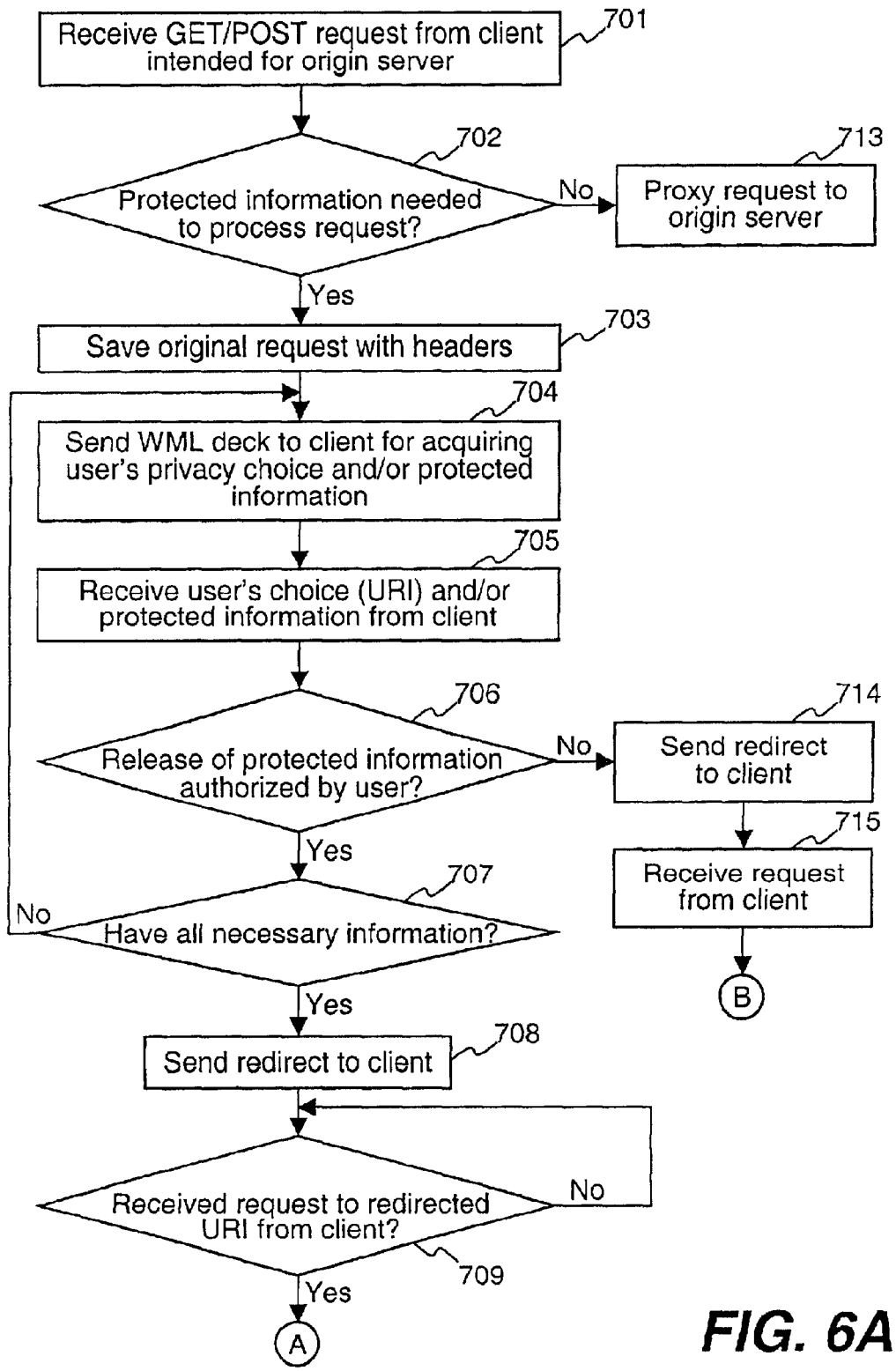
FIGS. 6A and 6B is a flow diagram showing a process that may be implemented by the proxy gateway, according to a second embodiment, to obtain a user's permission to release private information.
Figure 6B:
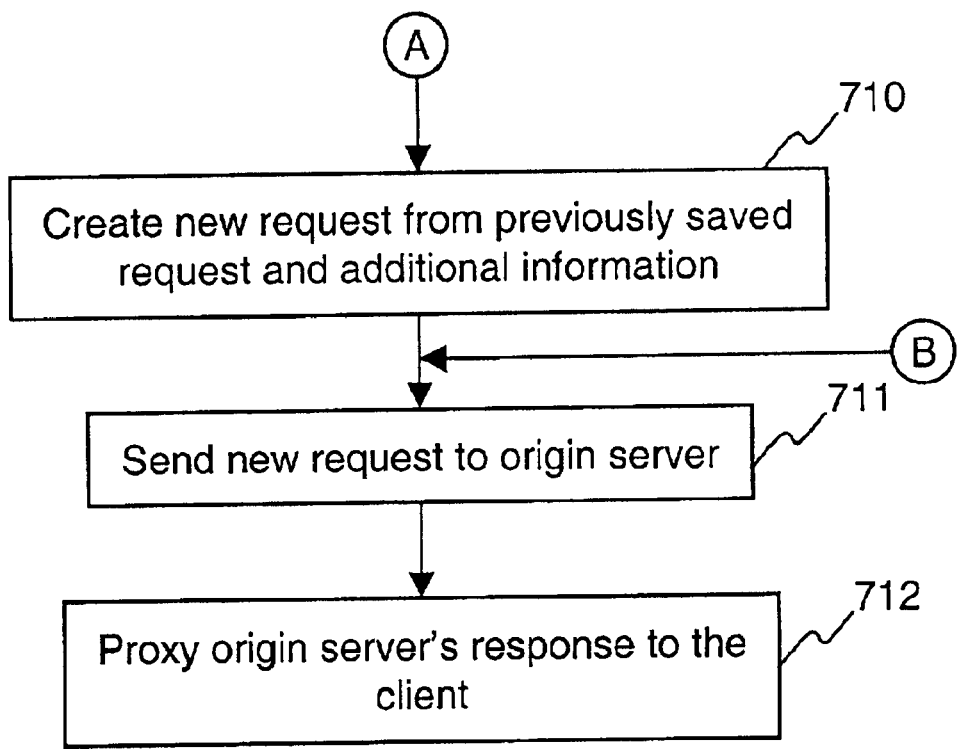
Figure 7:
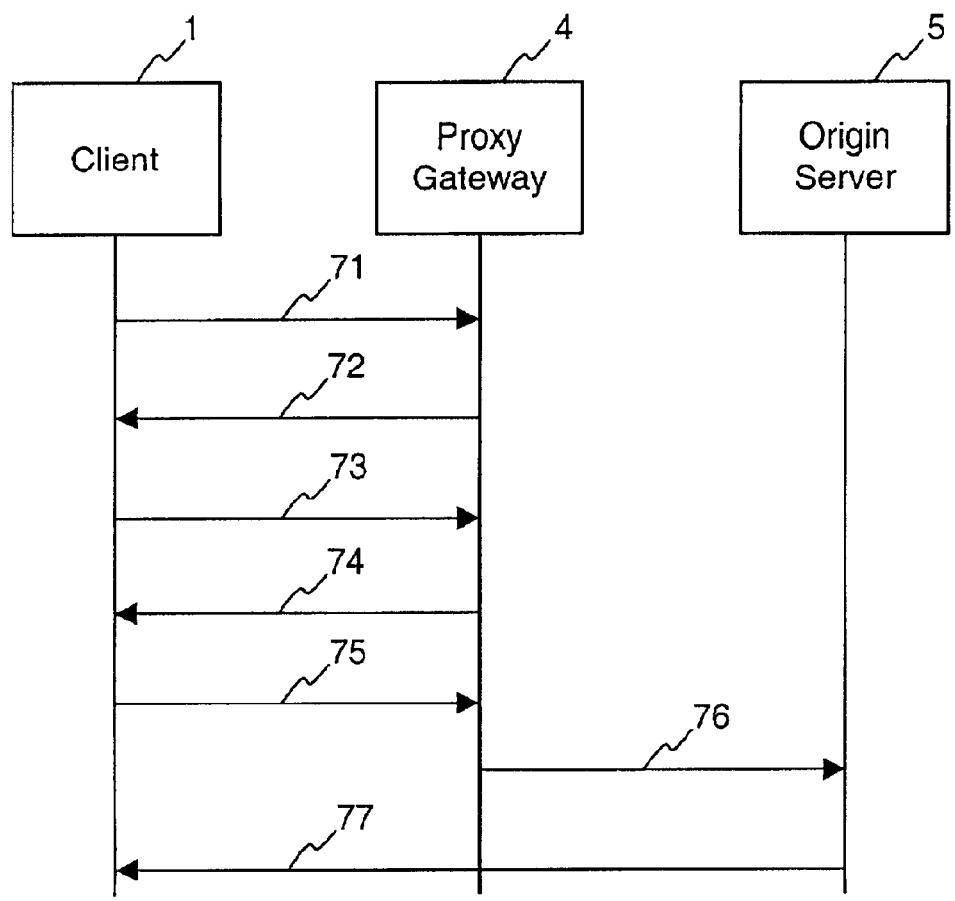
FIG. 7 illustrates the exchange of messages between network entities for the process of FIGS. 6A and 6B.

FIGS. 6A and 6B illustrate a process that may be implemented by the proxy gateway 4, according to a second embodiment, for purposes of obtaining a user's permission to release private information. FIG. 7 illustrates the exchange of messages between the a network entities for the process of FIGS. 6A and 6B. In FIGS. 6A, 6B and 7, the sequence progresses downward as time advances. In this second embodiment, the proxy gateway 4 has the "intelligence" to determine, solely from the client's request, that private information is needed to process a request. This intelligence may be in the form of a simple lookup table, stored in proxy gateway 4, of the URIs of applications known to require additional information about a requesting client.

Thus, at process block 701, proxy gateway 4 receives a standard HTTP GET/POST request 71 from one of the wireless devices 1 (the "client"). It may be assumed that the original request 71 specifies a URI representing the proxy gateway 4. At block 702 the proxy gateway 4 determines whether additional (private) information is needed for the origin server 5 to process the request. If no additional information is needed, the proxy gateway 4 simply proxies the request to the origin server 5 at block 713. If additional information is required, then at block 703 the proxy gateway 4 saves the original request with headers. It then sends a WML deck 72 to the client 1 at block 704 for generating the privacy negotiation GUI. At block 705 the proxy gateway 4 receives the user's choice and/or the private information 73 from the client 1.

If the proxy gateway 4 determines at block 706, based on the client's response 73, that the user authorized release of the private information, and if all of the required information is available at block 707, then at block 708 the proxy gateway 4 sends an HTTP redirect 74 (or the equivalent) to the client 1, to reset the browser context and to cause the browser to retry its original request.

If permission to release the information was given, but not all necessary information was received (block 707), the process loops back to block 704. If the proxy gateway 4 determines at block 706 that permission to release the private information was denied by the user, then the proxy gateway 4 sends a redirect to the client 1 at block 714 to reset the browser context and to cause the browser to retry its original request. The new request is received by the proxy gateway 4 at block 715 and is simply proxied to the origin server at block 711. The origin server may respond to this new request with an HTTP 409 response, although that is not necessarily so. The response by the origin server is received by the proxy gateway 4 and is proxied to the client 1 at block 712.

When the proxy gateway 4 receives at block 709 a request 75 directed to the redirected URI, it creates a new request including the private information and the information from the previously saved request at block 710. The proxy gateway 4 then sends a new request 76 to the origin server 5 at block 711. The proxy gateway 4 then proxies the origin server's response 77 to the client 1 at block 712.

As already noted, numerous variations on the above-described techniques are possible without departing from the basic principle. For example, a network entity may request private information associated with a client 1 independently of any request from the client 1. In that case, the request may be in the form of a service invocation document sent by the requesting entity to the proxy gateway 4, which specifies the requested private information. As another example, the proxy gateway 4 may have knowledge that a given network entity requires certain additional information on a periodic basis, at specified times, or in response to specify events. Consequently, the determination by the proxy gateway 4 that private information is needed does not have to be in response to a request from any network entity. As yet another example, in appropriate cases the private information may be released (when authorized) to a network entity other than the entity which requested it. And again, the above-described processes do not have to be implemented in a device which operates as a proxy or as a gateway.

Thus, a method and apparatus for controlling the release of private information over a network from a wireless, hand-held device have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of dynamically controlling release of information on a network, the method comprising:
   intercepting, at an intermediary processing system, a request sent from a mobile communication device to a network entity, the intermediary processing system coupled to the mobile communication device over a wireless network and to the network entity over a wired network;
   based on the intercepted request, determining in the intermediary processing system that protected information associated with the mobile communication device is needed by the network entity to fulfill the request;
   if said information is needed to fulfill the request, communicating with the mobile communication device to cause the mobile communication device to present a graphic user interface which allows a user of the mobile communication device to dynamically control release of the protected information; and
   releasing the protected information according to a result of said communicating.

2. A method as recited in claim 1, wherein said communicating comprises using Hypertext Transport Protocol (HTTP) to communicate with the mobile communication device.

3. A method as recited in claim 1, wherein the protected information comprises presence information relating to the mobile communication device.

4. A method as recited in claim 1, wherein the protected information comprises location information relating to the mobile communication device.

5. A method as recited in claim 1, wherein the protected information comprises information identifying the mobile communication device or its user.

6. A method as recited in claim 1, further comprising operating as a proxy between the mobile communication device and the network entity.

7. A method as recited in claim 1, further comprising providing a gateway to interface the wireless network on which the mobile communication device operates with the wired network.

8. A method as recited in claim 1, further comprising:
   operating as a proxy between the mobile communication device and the network entity; and
   providing a gateway to interface the wireless network on which the mobile communication device operates with the wired network.

9. A method as recited in claim 1, wherein the network entity is a remote web-based application implemented on the wired network.

10. A method as recited in claim 1, wherein said communicating with the mobile communication device comprises transmitting second information to the mobile communication device over the wireless network, the second information for use by the mobile communication device to present a graphic user interface to enable the user to select from a plurality of options relating to release of the information.

11. A method as recited in claim 1, wherein said determining in the intermediary processing system that protected information associated with the mobile communication device is needed by the network entity to fulfill the request is accomplished by looking up a table.

12. A processing system comprising:
    a data communication device;
    a processor; and
    a memory storing instructions executable by the processor to cause the processing system to execute a process comprising:
      intercepting a request sent from a mobile communication device to a network entity, the processing system coupled to the mobile communication device over a wireless network and to the network entity over a wired network;
      based on the intercepted request, determining that protected information associated with the mobile communication device is needed by the network entity to fulfill the request;
      if said information is needed to fulfill the request, communicating with the mobile communication device to cause the mobile communication device to present a graphic user interface which allows a user of the mobile communication device to dynamically control release of the protected information; and
      releasing the protected information according to a result of said communicating.

13. A processing system as recited in claim 12, wherein the protected information comprises presence information relating to the mobile communication device.

14. A processing system as recited in claim 12, wherein the protected information comprises location information relating to the mobile communication device.

15. A processing system as recited in claim 12, further comprising a proxy server to operate as a proxy between the mobile communication device and the network entity.

16. A processing system as recited in claim 12, further comprising a gateway to interface the wireless network on which the mobile communication device operates with the wired network.

17. A processing system as recited in claim 12, further comprising:
    a proxy server to operate as a proxy between the mobile communication device and the network entity; and
    a gateway to connect the wireless network on which the mobile communication device operates with the wired network.

18. A processing system as recited in claim 15, wherein the network entity is a remote web-based application implemented on the wired network.

19. A processing system as recited in claim 12, wherein said communicating with the mobile communication device comprises transmitting second information to the mobile communication device over the wireless network, the second information for use by the mobile communication device to present a graphic user interface to enable the user to select from a plurality of options relating to release of the information.

20. A processing system as recited in claim 12, wherein said determining that protected information associated with the mobile communication device is needed by the network entity to fulfill the request is accomplished by looking up a table.

21. A machine readable program storage medium storing sequences of instructions, which when executed on a processing system, cause the processing system to perform a method comprising:
    intercepting a request sent from a mobile communication device to a network entity, the processing system coupled to the mobile communication device over a wireless network and to the network entity over a wired network;

based on the intercepted request, determining that protected information associated with the mobile communication device is needed by the network entity to fulfill the request;

if said information is needed to fulfill the request, communicating with the mobile communication device to cause the mobile communication device to present a graphic user interface which allows a user of the mobile communication device to dynamically control release of the protected information; and releasing the protected information according to a result of said communicating.

22. A machine readable program storage medium as recited in claim 21, wherein the network entity is a remote web-based application implemented on the wired network.

23. A machine readable program storage medium as recited in claim 21, wherein said communicating with mobile communication device comprises transmitting second information to the mobile communication device over the wireless network, the second information for use by the mobile communication device to present a graphic user interface to enable the user to select from a plurality of options relating to release of the information.

24. A machine readable program storage medium as recited in claim 21, wherein said determining that protected information associated with the mobile communication device is needed by the network entity to fulfill the request is accomplished by looking up a table.

* * * * *